United States Patent [19]
Darton

[11] Patent Number: 4,638,480
[45] Date of Patent: Jan. 20, 1987

[54] DISTRIBUTED DIGITAL SIGNAL MULTIPLEXING

[75] Inventor: Kenneth S. Darton, Bishops Stortford, England

[73] Assignee: Standard Telephones & Cables Public Limited Company, London, England

[21] Appl. No.: 721,770

[22] Filed: Apr. 10, 1985

[51] Int. Cl.[4] ............... H04J 3/04; H04J 3/00
[52] U.S. Cl. .................... 370/112; 370/77; 340/870.11; 340/870.13
[58] Field of Search ............ 370/77, 112, 113, 85; 340/870.11, 870.13

[56] References Cited

U.S. PATENT DOCUMENTS

| 4,037,199 | 7/1977 | Rozehnal et al. | 340/870.13 |
| 4,040,059 | 8/1977 | Simons et al. | 340/870.13 |
| 4,177,357 | 12/1979 | Mayer | 370/112 |
| 4,504,943 | 3/1985 | Nagano et al. | 370/112 |

FOREIGN PATENT DOCUMENTS 1436878 5/1976 United Kingdom .

Primary Examiner—Douglas W. Olms
Assistant Examiner—Wellington Chin
Attorney, Agent, or Firm—Kerkam, Stowell, Kondracki & Clarke

[57] ABSTRACT

An arrangement for digital multiplexing onto a common highway a plurality of analogue input signals which are physically spaced apart over a distance. m time division multiplexing units 5a each have for each of n separate analogue signals n single channel pulse coding means 6 the outputs of which are time division multiplexed at a common outlet 12. Each multiplexing unit 5a also has a timing circuit 7 which can be either free running or locked to the similar timing circuit of a succeeding unit (5b). Each unit has (m-1) bypass connections 15, 16, 17 so that the multiplexed outlets of succeeding units are fed in parallel to a group multiplexer. The timing circuits, being cascaded, ensure that propagation delays for the digital signals from each of the n analogue inputs are obviated.

6 Claims, 3 Drawing Figures

DISTRIBUTED DIGITAL SIGNAL MULTIPLEXING

BACKGROUND OF THE INVENTION

This invention relates to an arrangement for digital multiplexing onto a common highway of a plurality of analogue input signals, particularly where the analogue inputs are physically spaced apart over a distance.

Typical examples of the application of the invention are a hydrophone listening system where the acoustic signals from a large number of hydrophone transducers are required to be transmitted to a single control and data processing unit. Some of the problems encountered in such a system are as follows:

(i) Phase delay. When a number of hydrophones are distributed linearly over a distance, say 100 meters, there will be absolute delay difference between the arrivals of analogue signals at a common point, e.g. a multiplexer at one end of the system, and differential frequency delay will occur across the band of frequencies in the spectrum of the signals. Both these delays will cause a differential distortion of the hydrophone signals.

(ii) Cross talk. With a number of signals travelling in channels in the same cable a level of cross talk between those channels will exist. This cross talk cannot be removed by filtering because it will be 'in-band'.

(iii) Attenuation. The attenuation which will exist between the hydrophone and a multiplexer will be different for each channel and therefore a measure of adjustment or calibration will be necessary.

(iv) Filtering. When filtering is applied on a one filter per analogue channel basis before multiplexing it must be very accurate and necessitates costly filter units so that no added distortion is introduced in a different degree into the individual channels.

These problems can be avoided in an all digital approach, that is one where the individual acoustic signals are digitally encoded as near the source as possible for onward transmission and multiplexing. Considering now the problems listed above the following advantages of the digital approach are:

(i) Phase delay. Delays in the analogue signals applied to a common encoder do not now exist. Any signal delays in the digital signals can be retimed or balanced out and very accurate phase relationships will exist between all the digital channel signals.

(ii) Cross talk. The cross talk between channels will now be between digital signals and can be eliminated by threshold detection or strobing.

(iii) Attenuation. Attenuation of the digital signals will not represent any attenuation of the analogue signal.

(iv) Filtering. The filtering can be carried out digitally according to a fixed law, this law being the same for each channel, and therefore no differential distortion will be introduced. Furthermore the digital filter can be multiplexed to perform the filter function on more than one channel, thereby reducing the cost of filtering.

SUMMARY OF THE INVENTION

According to the invention there is provided an arrangement for digital multiplexing onto a common highway a plurality of analogue input signals, the arrangement including m time division multiplexing units each having for each of n separate analogue input signals a signal channel comprising an analogue-to-digital encoding means, a shift register in which the encoding means output may be temporarily stored, means for periodically reading out the contents of the shift register to an outlet common to all the n channels, clock and timing means and synchronising means for controlling the encoding and shift register means, whereby the digitally encoded signals in the n shift register are read out to the common outlet in a predetermined multiplexed sequence, the outlets from the m time division multiplexing units being fed to a common multiplexer where the m outlets of n channels each are multiplexed onto the common highway, the clock, timing and synchronising means in the m time division multiplexing units being cascaded, the unit furthest from the common multiplexer having clock and sync pulse generating means generating initial clock and synchronising pulses for the n channels in that unit, each subsequent unit nearer the common multiplexer and the common multiplexer itself having means for regenerating the clock and sync pulse received from the preceding unit and means for deriving from the regenerated pulses the local clock and sync pulses required in that unit or common multiplexer.

One of the main advantages of the invention is that a basic n channel, e.g. 16 channel, unit is that it can be utilised in any one of a number of system configurations without recourse to modification of the basic unit. In the context of a hydrophone system two principle uses are:

(a) A towed system, and
(b) A static system.

In a towed system three different configurations could be:

($a_i$) A leading unit consisting essentially of a first level 16-channel multiplexer with facilities for extending the connections to a number of further following units.

($a_{ii}$) Intermediate units consisting of the same basic first level 16-channel multiplexer the connection of which is extended forwards through the facilities of the leading unit and which also has facilities for extending the connections to further following units.

($a_{iii}$) A trailing unit consisting of the same basic first level 16-channel multiplexers the connection of which is extended forwards through the facilities of the preceding units.

When more than one unit is being trailed the extension facility in each unit need be no more than through connections, the outputs of the units being multiplexed at a common group multiplexer.

In a static listening system the layout configuration can be a number of first-level 16-channel multiplexers each separately connected to a common group multiplexer.

For a basic multiplexer unit to be usable in any of the aforementioned configurations a versatile clock and sync pulse generating means is required. In the embodiments to be described the timing circuits are designed to be both free running or frequency locked regenerative circuits. Thus in the towed system the rearmost unit generates clock and sync pulses for its own use and at the same time feeds these forward to the next unit as reference pulses. In the next unit the timing circuits are frequency locked to the reference pulses. Thus, regardless of the transmission distances the propagation delays of both the data channels and the clock and sync channels are the same as far as the group multiplexer. If the group multiplexer has similar timing circuits then the propagation delays are the same right the way through to the data processing unit on the towing vessel.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
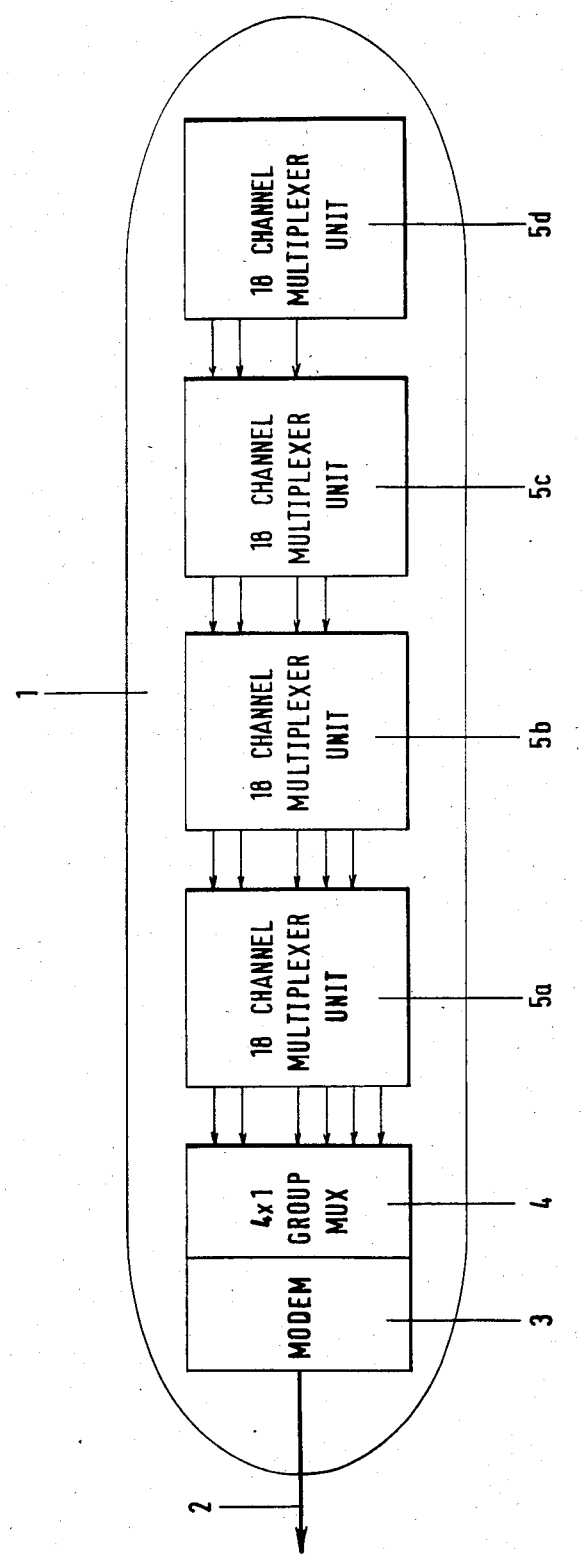
FIG. 1 illustrates the basic layout of a towed hydrophone system.

In the system shown in FIG. 1 an assembly 1, hereinafter designated a 'tail' is towed at a distance, say 5 Km, behind a vessel (not shown) by means of a towing cable 2 which combines a strength member with electrical conductors, the latter providing electrical connections between the equipment in the tail and equipment on board the towing vessel. Within the tail there are a transmission modem 3, a group multiplexer 4, and a number of channel multiplexing units 5a, 5b, 5c and 5d. Each channel multiplexing unit 5a etc. handles 16 data channels plus two address channels (total 18 channels). In addition each unit also has one clock channel and one sync channel. In a four-unit tail the multiplexer 4 is required to multiplex $4 \times 18 = 72$ channels. The modem 3 is required to transmit the 72 multiplexed channels plus the two channels containing clock and sync pulses.

Figure 2:
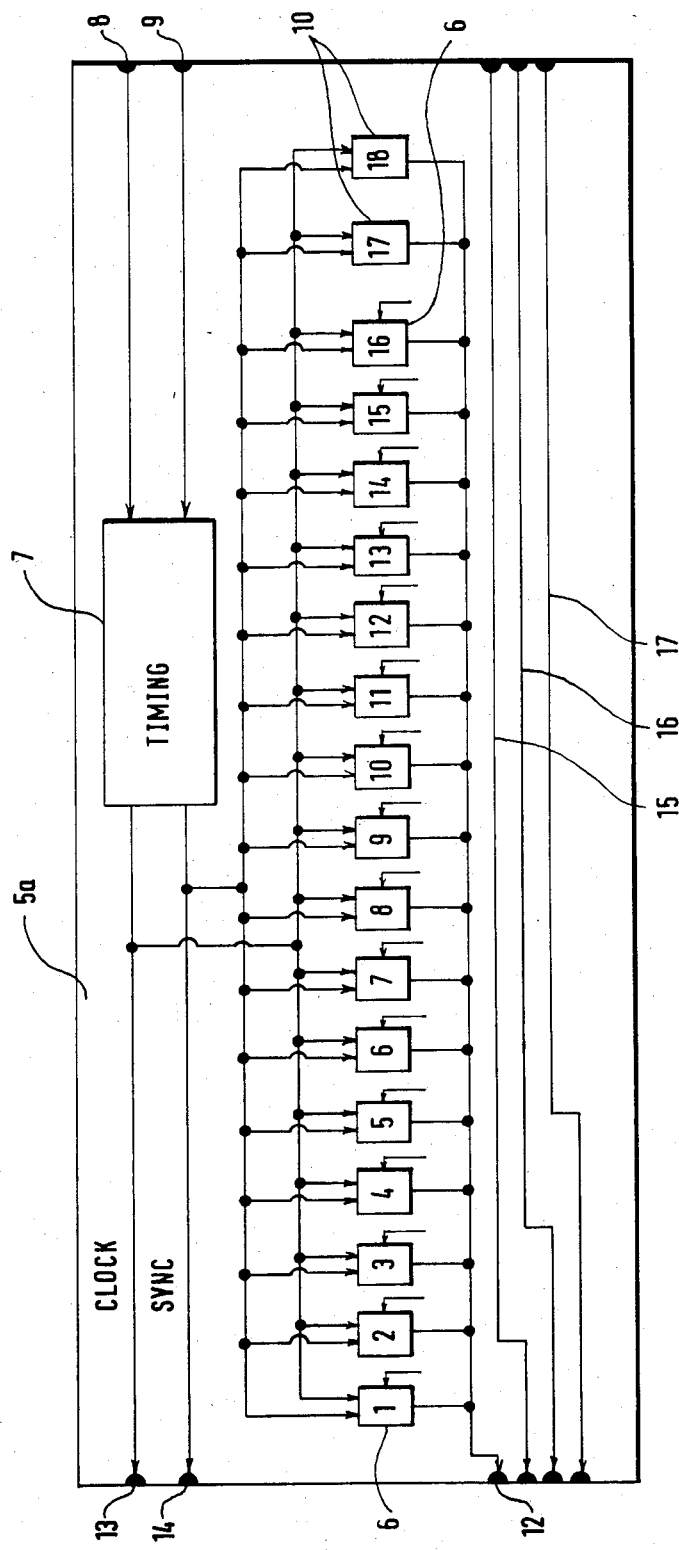
FIG. 2 illustrates the basic layout of an 18-channel multiplexer unit.

FIG. 2 shows a schematic of a channel multiplexing unit. Each unit has 16 analogue inputs from hydrophones which are fed to individual single channel pulse encoders 6. The unit also has a free running/regenerative timing circuit 7 which controls the single channel coders 6. In the case of the last unit there is no input at terminals 8 and 9 and the free running timing circuit 7 generates clock and sync pulses for the 16 channels. Two additional channels 10 incorporate address code generators. The total $16+2=18$ channels are read out periodically in time division multiplex via terminal 12. The clock and sync pulses are also fed via terminals 13, 14 to the input terminals (8, 9) of the next unit wherein the timing circuit (7) is frequency and phase locked to the incoming pulses. Finally, each unit includes bypass connections 15, 16 and 17 arranged to extend forwards the time division multiplexed groups of channels from succeeding units. Characteristically, in an m-unit tail each unit will have (m-1) bypass connections, although only in the leading will all the bypass connections be utilised whilst in the last unit none of them will be used.

Figure 3:
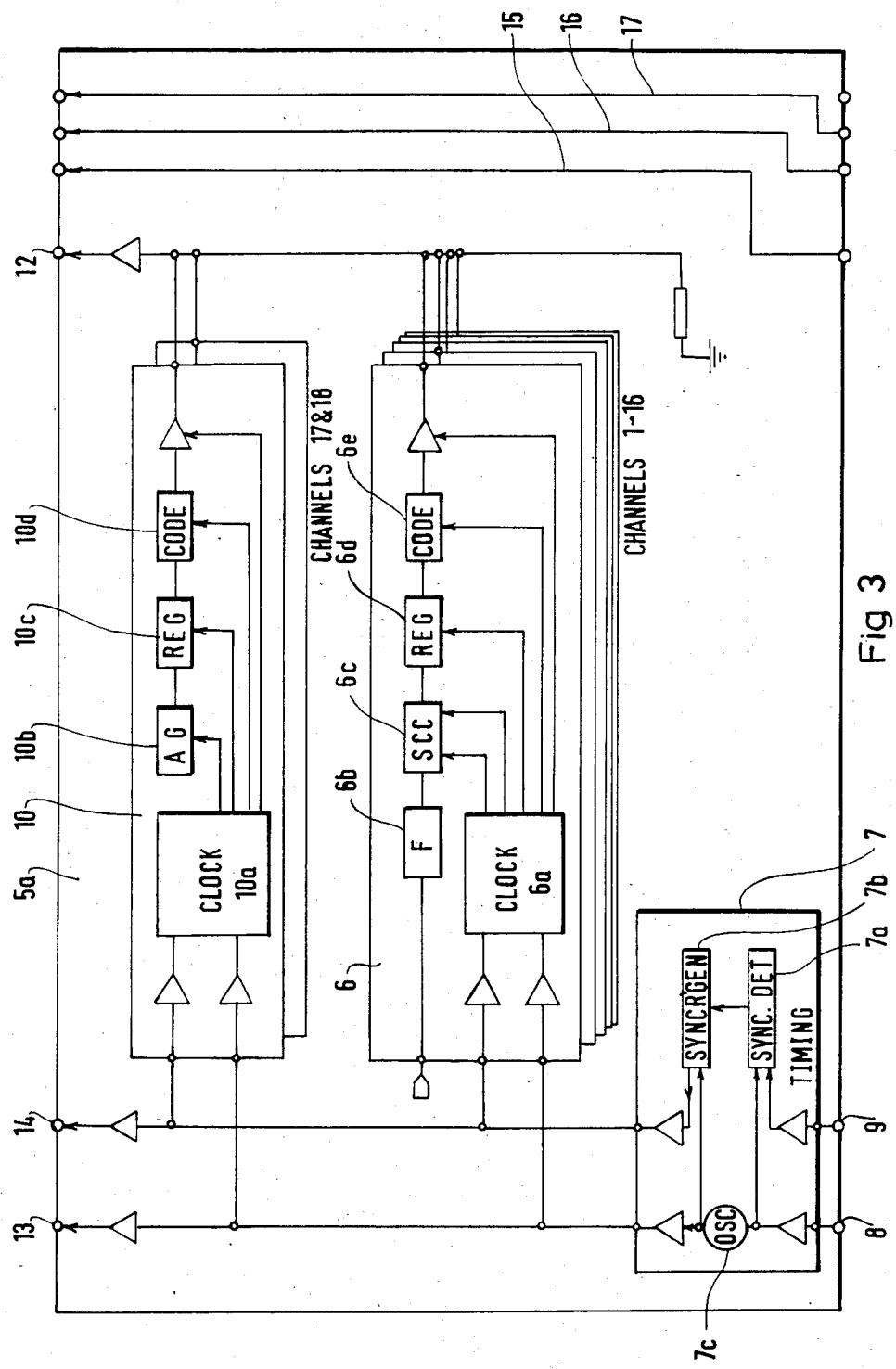
FIG. 3 illustrates the basic circuitry of the unit of FIG. 2.

FIG. 3 shows in greater detail the components of the unit of FIG. 2. The timing circuit 7 comprises a sync pulse detector 7a, which receives both the clock and sync pulses from a succeeding unit (if any), a sync pulse regenerator 7b, and a phase locked oscillator 7c which also receives the clock pulses from the succeeding unit (if any). The clock and sync pulses from timing circuit 7 are fed to the 16 channel circuits 6. Each channel circuit 6 has a local clock and timing circuit 6a which derived clock and stroke pulses for that channel. The analogue input from a hydrophone 18 is firstly fed to an analogue filter and amplifier circuit 6b. The filtered and amplified signals are then linearly encoded in a single channel coder 6c. A particularly suitable form of encoder is one in which the analogue signal is first encoded into a pulse density modulated signal (PDM), in which the instantaneous amplitude of the analogue signal is represented by the ratio of '1's to '0's in a binary signal. Whilst in a PDM channel a high bit rate may be necessary to convey adequately the information content of the analogue signal subsequent processing of the PDM signal is possible to provide a pulse coded output the bit rate of which is comparable with conventional PCM systems. Such processing is disclosed in British Pat. No. 1,436,878 (M. J. Gingell-II). Basically this form of processing comprises digital filtering of the PDM signal and then selecting, by means of logic circuits, every qth group of r pulses in the digitally filtered signal. In the example given in the above mentioned patent, for a telephone system, a PDM signal having a PDM rate of 8.064 Mb/s is considered. After filtering this can be regarded as an arbitrary stream of 14-bit words with a word rate of 8.064 Mw/s. If now every 504th 14-bit word is selected the output is a PCM signal of 16 Kw/s. However, it is apparent that in the present case involving hydrophones the frequencies, bit rates and word rates may be significantly different to those quoted above for a telephone application. The PCM words from the coder 6c are temporarily stored in a shift register 6d. At the appropriate time the stored words are read out of the register and the bits are recoded according to the so-called "Top Hat" (bipolar) code in order 6e for transmission to the group multiplexer. The 1b hydrophone channels are considered as a group and associated with that group is an address code generated in channels 17 and 18. Each of these two channels has a local clock and timing circuit 10a which receives the clock and sync pulses from the timing circuit 7. An address code generator 10b generates an r-bit (e.g. b 14-bit) word which is stored in shift register 10c and recorded in coder 10d in exactly the same ways as the PCM words in the 16 hydrophone channels. Both channels 17 and 18 generate the same word, the two address words together effectively creating a 2 r-bit code.

In practice each unit 5a etc. is fabricated as a set of printed circuits interconnected by twisted pairs of conductors, spaced over a distance of perhaps 100 meters to provide adequate spacing of the individual hydrophones. The total tail may thus be in excess of 400 meters in length.

At the group multiplexer 4 the four PCM groups of 18 channels each are multiplexed in accordance with known techniques for transmission via the modem 3 and the towing cable 2 to the towing vessel.

I claim:

1. An arrangement for digital multiplexing onto a common highway a plurality of analogue input signals, the arrangement including a series of m time division multiplexing units, each multiplexing unit having for each of n separate analogue input signals a signal channel comprising an analogue-to-digital encoding means, a shift register in which said encoding means output may be temporarily stored, and means for periodically reading out the contents of the shift register to an outlet common to all the n channels, clock and timing means and synchronising means for controlling the encoding and said shift register, in each of the n channels whereby the digitally encoded signals in the n shift register are read out to said outlet in a predetermined multiplexed sequence, outlets from the m time division multiplexing units being fed to a common multiplexer where the m outlets of n channels each are multiplexed onto said common highway, the clock, said timing and synchronising means in the m time division multiplexing units being cascaded, the multiplexing unit furthest from the common multiplexer having clock and sync pulse generating means generating initial clock and synchronisiong pulses for the n channels, each subsequent multiplexing unit nearer the common multiplexer and the common multiplexer itself having means for regenerating clock and sync pulses received from the preceding multiplexing unit and means for deriving from the regenerated pulses the local clock and sync pulses required in the multiplexing unit or common multiplexer.

2. An arrangement according to claim 1 wherein the analogue-to-digital conversion means for each of the n channels includes means for encoding the analogue input signal into a pulse density modulated (PDM) signal, in which the instantaneous amplitude of the analogue signal is represented by the ratio of '1's to '0's in a binary signal, means for digitally filtering the PDM signal, and means for selecting every qth group of v pulses in the digitally filtered signal to provide a pulse coded output signal.

3. An arrangement according to claim 2 wherein the analogue-to-digital conversion means for each channel further includes means for recoding the binary pulse coded output from the shift register for transmission to the common multiplexer.

4. An arrangement according to claim 1 wherein each of the m time division multiplexing units is provided with m−1 independent connection paths in parallel whereby the m units may be connected in series with one another so that whilst the clock, timing and synchronising means in the m units and the common multiplexer are cascaded the outlets from the m units are fed in parallel to the common multiplexer.

5. An arrangement according to claim 1 wherein each of the m time division multiplexing units includes at least one further channel time multiplexed with the n channels, the further channel or channels not having an analogue input but having code word generating means for generating an address code word or word for the associated group of n channels in that unit.

6. An arrangement according to claim 4 wherein each of the m time division multiplexing units includes at least one further channel time multiplexed with the n channels, the further channel or channels not having an analogue input but having code word generating means for generating an address code word or word for the associated group of n channels in that unit.

* * * * *